(12) United States Patent
Konitzer et al.

(10) Patent No.: US 10,563,518 B2
(45) Date of Patent: Feb. 18, 2020

(54) GAS TURBINE ENGINE TRAILING EDGE EJECTION HOLES

(71) Applicant: GENERAL ELECTRIC COMPANY, Schenectady, NY (US)

(72) Inventors: Douglas Gerard Konitzer, West Chester, OH (US); Matthew Lee Krumanaker, Blue Ash, OH (US); Weston Nolan Dooley, West Chester, OH (US); James Herbert Deines, Mason, OH (US)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 15/043,933

(22) Filed: Feb. 15, 2016

(65) Prior Publication Data

US 2017/0234137 A1    Aug. 17, 2017

(51) Int. Cl.
*F01D 5/18* (2006.01)
*F01D 9/06* (2006.01)

(52) U.S. Cl.
CPC ............. *F01D 5/186* (2013.01); *F01D 9/065* (2013.01); *F05D 2240/122* (2013.01); *F05D 2240/304* (2013.01); *F05D 2250/323* (2013.01); *F05D 2250/324* (2013.01); *F05D 2250/712* (2013.01); *F05D 2260/2214* (2013.01); *Y02T 50/676* (2013.01)

(58) Field of Classification Search
CPC .... F01D 5/186; F01D 9/065; F05D 2240/122; F05D 2240/304; F05D 2250/3223; F05D 2250/324; F05D 2250/712; F05D 2260/2214
See application file for complete search history.

(56) References Cited

U.S. PATENT DOCUMENTS

| 4,236,870 | A | * | 12/1980 | Hucul, Jr. | F01D 5/187 415/115 |
| 4,638,628 | A | | 1/1987 | Rice | |
| 5,288,207 | A | * | 2/1994 | Linask | F01D 5/187 416/97 R |
| 5,368,441 | A | * | 11/1994 | Sylvestro | F01D 5/187 416/90 A |
| 5,931,638 | A | * | 8/1999 | Krause | F01D 5/186 415/115 |
| 6,234,754 | B1 | * | 5/2001 | Zelesky | F01D 5/187 415/115 |
| 6,616,406 | B2 | * | 9/2003 | Liang | F01D 5/186 416/97 R |
| 7,033,136 | B2 | * | 4/2006 | Botrel | F01D 5/187 415/115 |

(Continued)

OTHER PUBLICATIONS

Extended European Search Report and Opinion issued in connection with corresponding EP Application No. 17155993.3 dated Jul. 21, 2017.

*Primary Examiner* — Woody A Lee, Jr.
*Assistant Examiner* — Christopher R Legendre
(74) *Attorney, Agent, or Firm* — McGarry Bair PC (57) ABSTRACT

An apparatus and method for an airfoil for a gas turbine engine includes a trailing edge cooling circuit utilizing a plurality of trailing edge ejection holes. The ejection holes can include a circumferentially radiused inlet, a converging section, a metering section, and a diverging section to improve airfoil cooling as well as castability.

29 Claims, 8 Drawing Sheets

(56) References Cited

U.S. PATENT DOCUMENTS

| | | | |
|---|---|---|---|
| 7,198,468 B2* | 4/2007 | Papple | F01D 5/187 |
| | | | 416/97 R |
| 7,210,906 B2* | 5/2007 | Papple | F01D 5/187 |
| | | | 416/1 |
| 7,607,891 B2 | 10/2009 | Cherolis et al. | |
| 7,806,659 B1 | 10/2010 | Liang | |
| 7,850,428 B2* | 12/2010 | Tibbott | F01D 5/186 |
| | | | 415/115 |
| 8,109,726 B2 | 2/2012 | Liang | |
| 8,192,146 B2* | 6/2012 | Liang | F01D 5/186 |
| | | | 415/115 |
| 8,807,945 B2 | 8/2014 | Spangler et al. | |
| 8,920,123 B2* | 12/2014 | Lee | F01D 5/186 |
| | | | 416/92 |
| 9,038,700 B2 | 5/2015 | Dube et al. | |
| 9,115,590 B2 | 8/2015 | Spangler et al. | |
| 9,314,838 B2* | 4/2016 | Pointon | F01D 5/187 |
| 9,366,144 B2* | 6/2016 | Zess | F01D 5/187 |
| 9,638,046 B2* | 5/2017 | Papple | F01D 5/187 |
| 2009/0068021 A1* | 3/2009 | Liang | F01D 5/187 |
| | | | 416/97 R |
| 2013/0209234 A1 | 8/2013 | Xu | |
| 2013/0232991 A1 | 9/2013 | Otero | |
| 2013/0251538 A1 | 9/2013 | Zess et al. | |
| 2013/0259645 A1 | 10/2013 | Bergholz, Jr. et al. | |
| 2013/0302176 A1 | 11/2013 | Bergholz, Jr. et al. | |
| 2013/0302178 A1 | 11/2013 | Bergholz, Jr. et al. | |
| 2014/0286791 A1 | 9/2014 | Lee et al. | |
| 2017/0234137 A1* | 8/2017 | Konitzer | F01D 5/186 |
| | | | 416/1 |
| 2018/0298763 A1* | 10/2018 | Lee | F01D 5/187 |

\* cited by examiner

GAS TURBINE ENGINE TRAILING EDGE EJECTION HOLES

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, embodiments of the invention relate to an airfoil for a gas turbine engine including an outer surface defining a pressure side and a suction side extending axially between a leading edge and a trailing edge defining a chord-wise direction and extending radially between a root and a tip defining a span-wise direction. The airfoil further includes a cooling circuit located within the airfoil and having a cooling passage extending from the root toward the tip and a plurality of trailing edge ejection holes provided in the cooling passage in the span-wise direction and an axial flow arrangement of a circumferentially radiused inlet section, a converging section, a metering section, and a diverging section.

In another aspect, embodiments of the invention relate to an airfoil for a gas turbine engine including a cooling circuit having a cooling passage extending from a root toward a tip in a span-wise direction with a plurality of trailing edge ejection holes provided in the cooling passage including a circumferentially radiused inlet section, a converging section, a metering section, and a diverging section.

In yet another aspect, embodiments of the invention relate to a method of providing a flow of cooling fluid through a plurality of trailing edge ejection holes includes accelerating the flow of cooling fluid into the trailing edge ejection holes and decelerating the flow of cooling fluid exiting the trailing edge ejection holes.

DESCRIPTION OF EMBODIMENTS OF THE INVENTION

The described embodiments of the present invention are directed to a plurality of trailing edge ejection holes arranged within an airfoil for a gas turbine engine. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
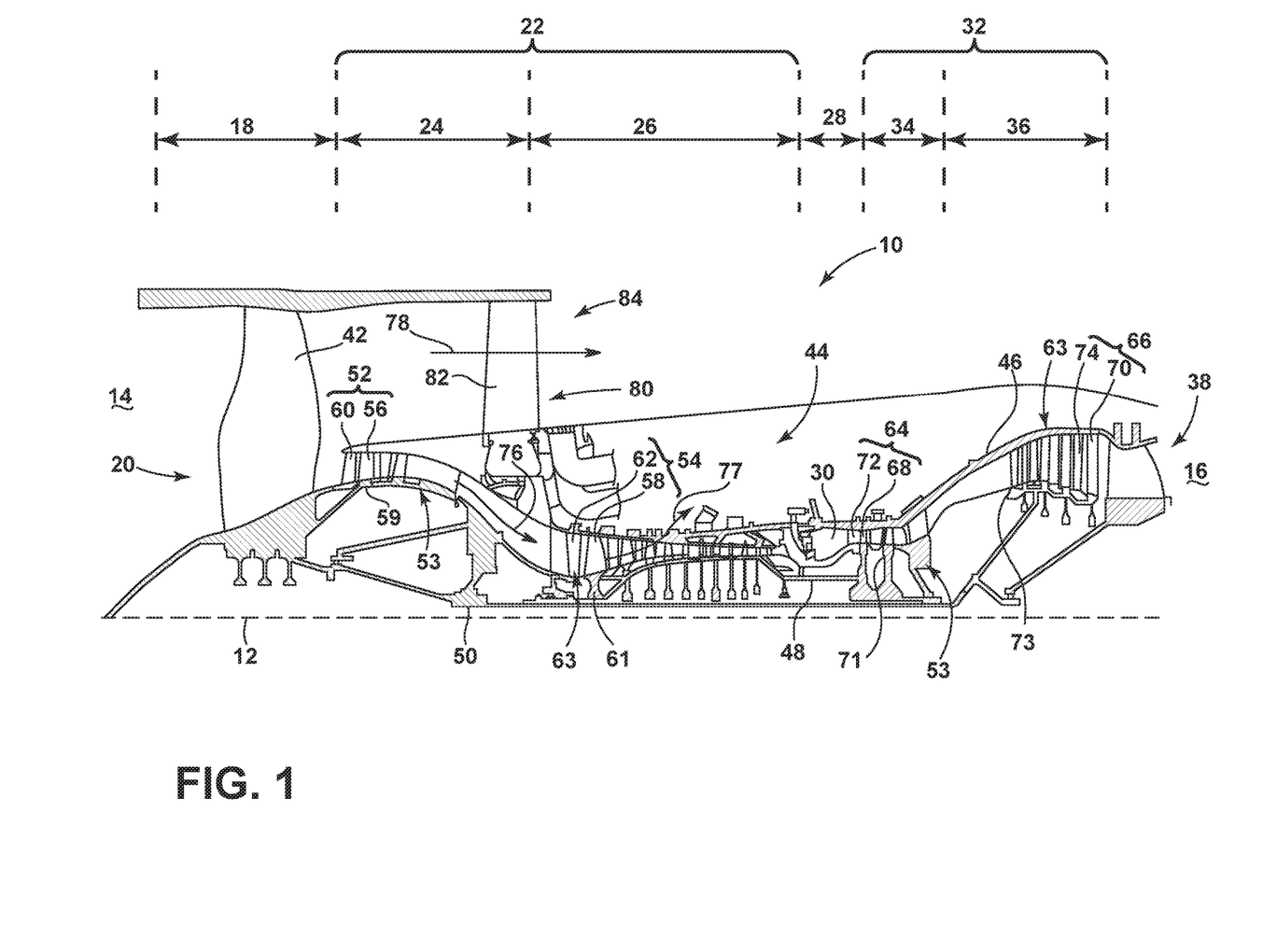
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
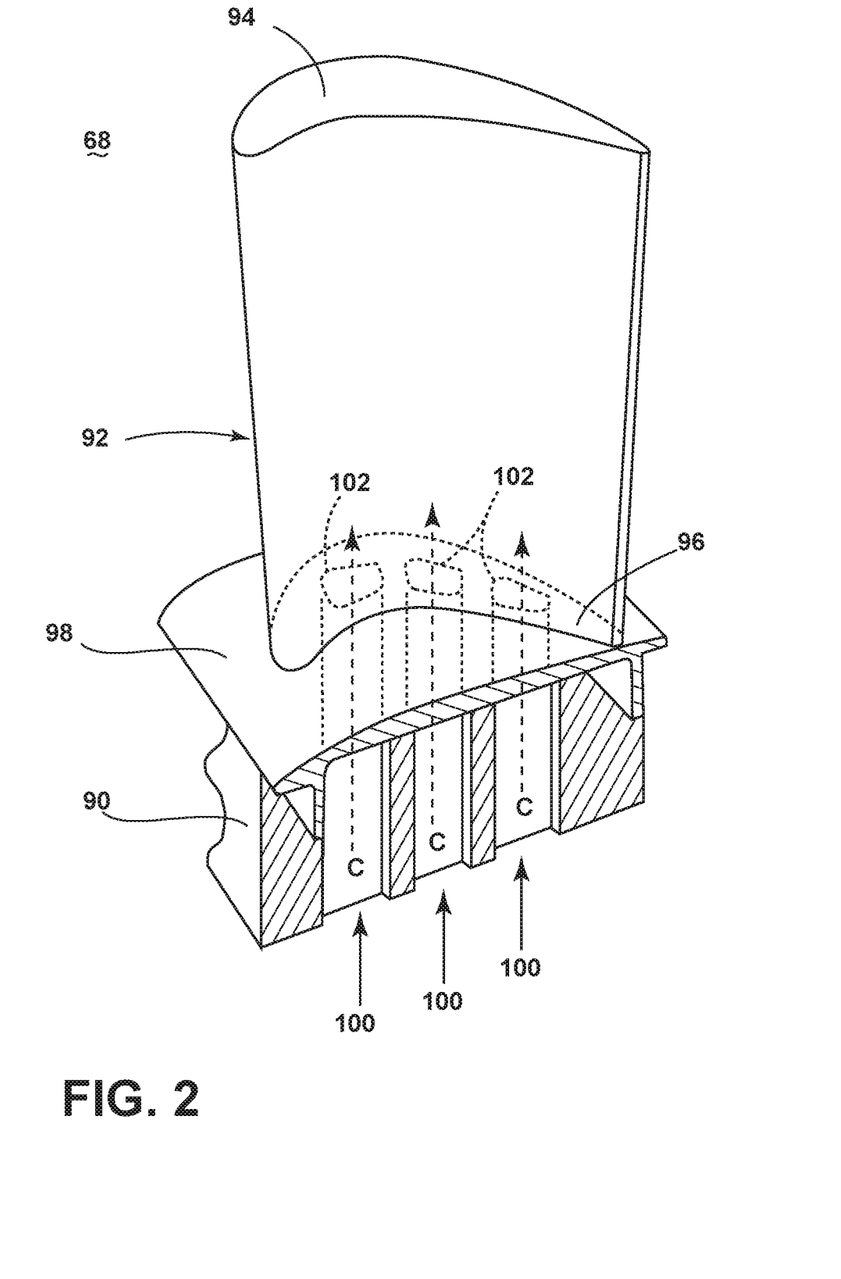
FIG. 2 is an isometric view of an airfoil of the engine of FIG. 1 in the form of a blade.

FIG. 2 is a perspective view of an engine component in the form of one of the turbine blades 68 of the engine 10 from FIG. 1. The turbine blade 68 includes a dovetail 90 and an airfoil 92. The airfoil 92 includes a tip 94 and a root 96 defining a span-wise direction therebetween. The airfoil 92 mounts to the dovetail 90 at a platform 98 at the root 96. The platform 98 helps to radially contain the turbine engine mainstream air flow. The dovetail 90 can be configured to mount to a turbine rotor disk 71 on the engine 10. The dovetail 90 further includes at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90.

Figure 3:
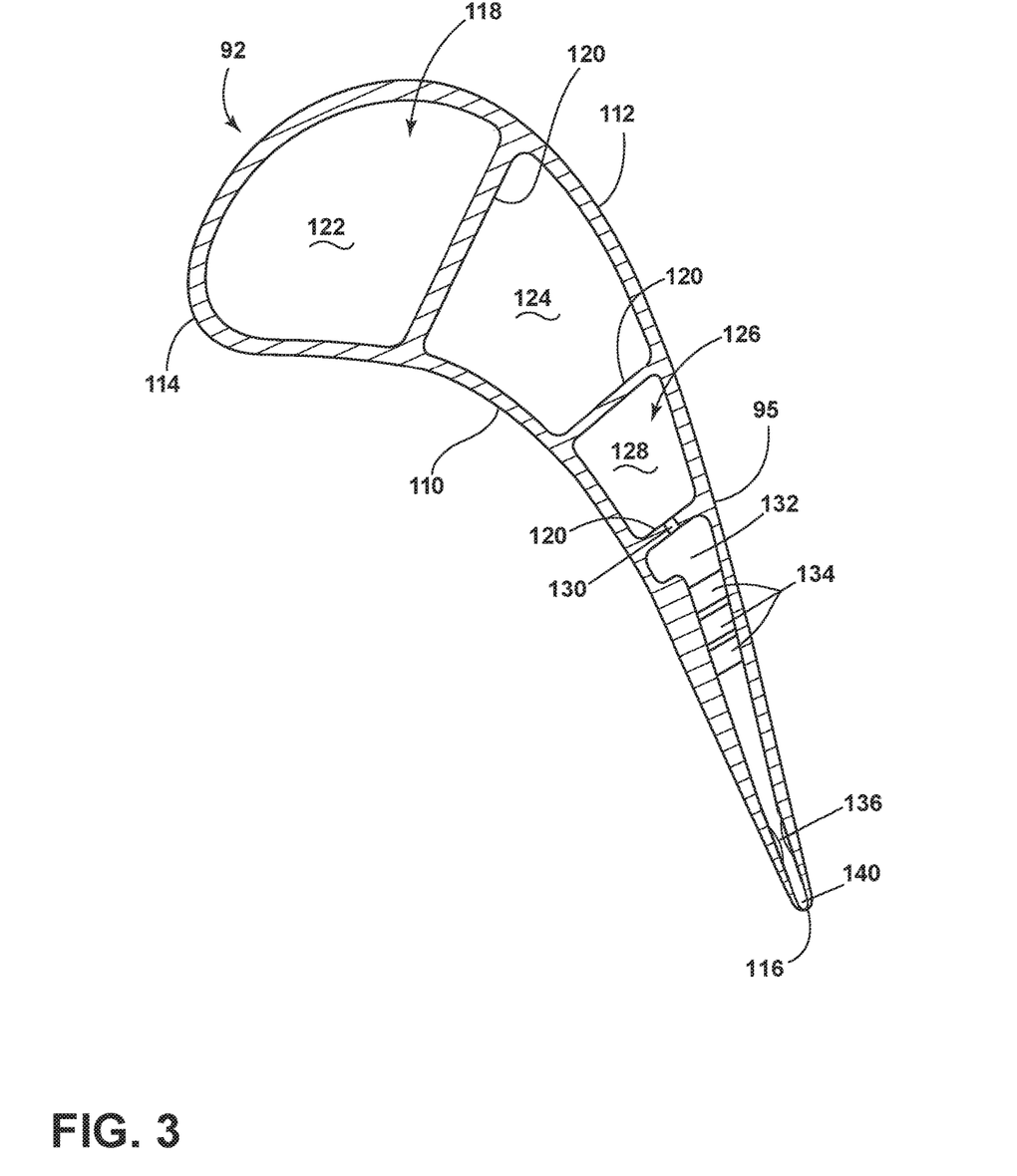
FIG. 3 is a cross-section of the airfoil of FIG. 2 illustrating a trailing edge circuit.

Turning to FIG. 3, the airfoil 92, shown in cross-section, has a concave-shaped pressure sidewall 110 and a convex-shaped suction sidewall 112 which are joined together to define an airfoil shape with a leading edge 114 and a trailing edge 116, defining a chord-wise direction therebetween. The airfoil 92 has an interior 118 defined by the sidewalls 110, 112. The blade 68 rotates in a direction such that the pressure sidewall 110 follows the suction sidewall 112. Thus, as shown in FIG. 3, the airfoil 92 would rotate upward toward the top of the page.

One or more ribs 120 can divide the interior 118 into multiple cooling channels. A leading edge cooling channel 122 can be disposed adjacent to the leading edge 114, and a mid channel 124 can be adjacent to the leading edge cooling channel 122. It should be appreciated that the leading edge and mid channels 122, 124 are exemplary, and can be single channels extending in the span-wise direction, or can be complex cooling circuits, having multiple features such as passages, channels, inlets, pin banks, circuits, sub-circuits, film holes, plenums, mesh, turbulators, or otherwise and such details are not germane to the invention.

A trailing edge circuit 126 can include a trailing edge plenum 128, impingement holes 130, an exhaust passage 132, pin holes 134, ejection holes 136, and a trailing edge slot opening 140. The impingement holes 130 fluidly couple the trailing edge plenum 128 to the exhaust passage 132. The exhaust passage 132 is fluidly coupled to the trailing edge 116 through the pin holes 134 and the ejection holes 136. The trailing edge circuit 126 and the interior 118 are fluidly coupled to the exterior of the airfoil 92 via the trailing edge slot opening 140.

It should be appreciated that while the ejection holes 136 are disposed adjacent to the trailing edge 116, there can be an additional channel or plenum disposed between the trailing edge ejection holes 136 and the trailing edge 116. Such a channel can extend the full span-wise length of the airfoil 92 or can include discrete channels or even single exhaust holes, such as film holes for exhausting the cooling fluid at the trailing edge.

Figure 4:
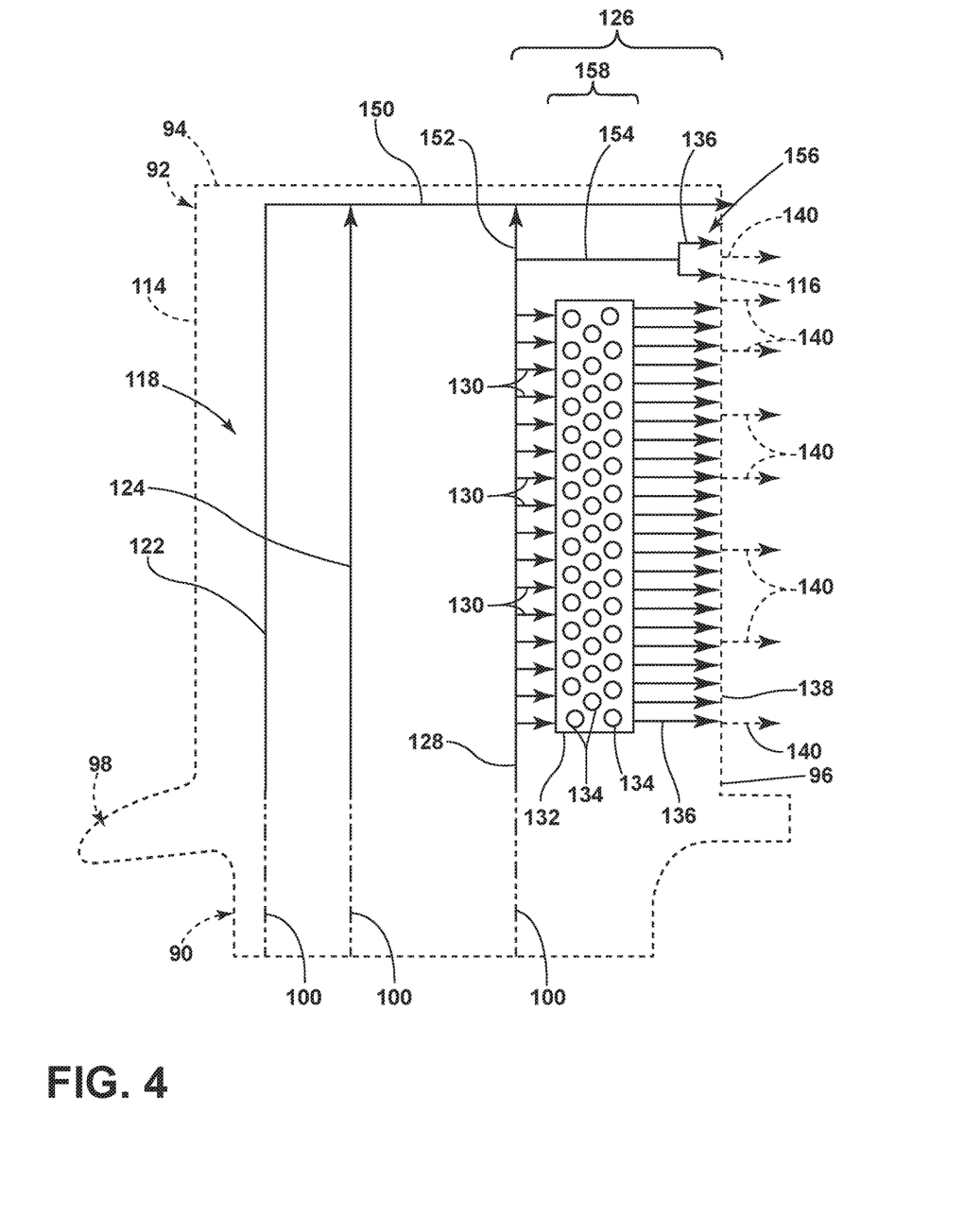
FIG. 4 is a flow diagram illustrating the trailing edge circuit of FIG. 3.

Looking at FIG. 4 a flow diagram for the leading edge and mid cooling channels 122, 124 and the trailing edge cooling circuit 126 are schematically illustrated. The airfoil 92 is schematically shown in broken line to illustrate the general configuration of the cooling channels and circuits 122, 124, 126 within the airfoil 92. The airfoil 92 defines the interior 96 as a cavity extending from the leading edge 114 to the trailing edge 116 in the chord-wise direction and from the tip 94 to the root 96 in the span-wise direction, and which can be divided into distinct channels or passages by internal walls to form the cooling channels and circuits 122, 124, 126 which direct a flow of cooling fluid through the airfoil 92. A tip cooling passage 150, disposed above the tip 94 of the airfoil 92, can extend in a substantially chord-wise direction from adjacent the leading edge 114 toward the trailing edge 116. The tip cooling passage 150 provides a common passage for the cooling channels and circuits 122, 124, 126 to exhaust the cooling fluid, such that the cooling fluid can be exhausted from the airfoil 92 if not being exhausted through one or more film holes or other exits.

Each channel or circuit 122, 124, 126 can be fed with a flow of cooling fluid from the inlet passages 100. Each inlet passage 100 can supply a cooling circuit individually, or multiple channels or circuits 122, 124, 126 can be fed from a common inlet passage 100.

The trailing edge circuit 126, illustrated as being fed from one inlet passage 100, can be provided with a flow of cooling fluid in the trailing edge plenum 128 in a root 96 to tip 94 direction. A portion of the flow of cooling fluid can be provided from the trailing edge plenum 128 into the tip cooling passage 150 through a tip duct 152. Additionally, a portion of the cooling fluid within the tip duct 152 can be provided to a flag passage 154 where the cooling fluid can be provided to a tip flag 156.

The remaining portion of the flow of cooling fluid within the trailing edge plenum 128 can flow into a trailing edge mid passage 132 through the plurality of impingement holes 130. Within the mid passage 132 the cooling fluid passes through a pin bank 158 having multiple pins 134. From the pin bank 158, the cooling fluid is passed to the trailing edge 116 through multiple trailing edge ejection holes 136. Upon exiting the trailing edge ejection holes 136, the cooling fluid can be exhausted from the airfoil 92, being in fluid communication with the tip flag 156 and the tip cooling passage 150, where the cooling fluid can be exhausted through one or more trailing edge slot openings 140 at the trailing edge 116.

It should be appreciated that cooling channels and circuits 122, 124, 126, as illustrated in FIG. 4 are exemplary of one implementation of the cooling circuits within an airfoil 92 and should not be construed as limited by the particular geometry, passages, pin banks, film holes, or otherwise. It should be further understood that while the cooling channels and circuits 122, 124, 126 are illustrated as generally moving from the leading edge 114 toward the trailing edge 116 or the trailing edge 116 toward the leading edge 114, the illustration is only an exemplary depiction of the cooling circuits themselves. The particular passages, channels, inlets, or otherwise can flow in any direction relative to the airfoil 92, such as in the trailing or leading edge 114, 116 direction, tip 94 or root 96 direction, or toward the pressure 110 or suction 112 sidewalls of the airfoil 92, or any combination thereof.

Figure 5:
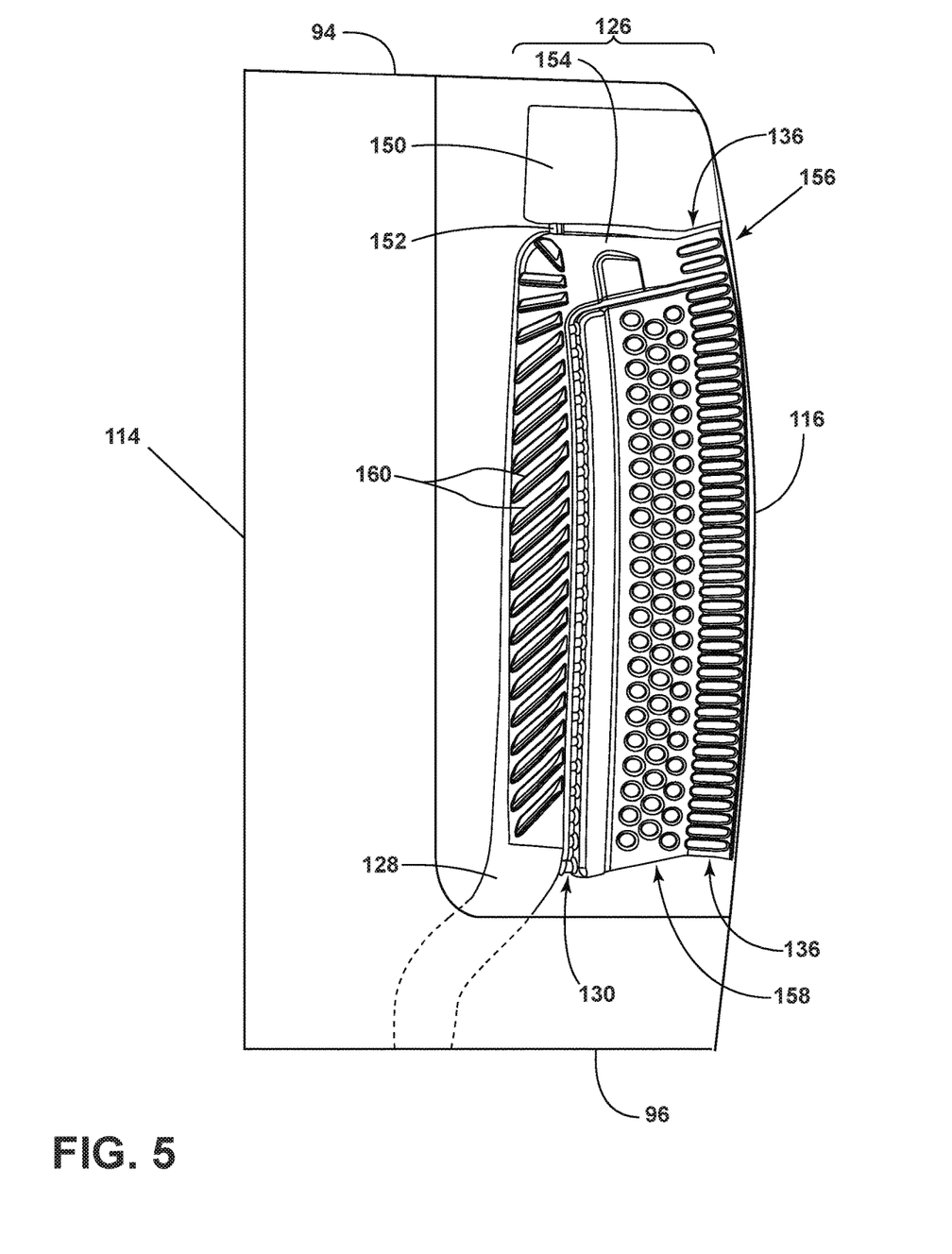
FIG. 5 is core view of the trailing edge circuit of FIG. 4.

Looking at FIG. 5, a core view of the trailing edge circuit 126 is illustrated, showing the trailing edge ejection holes 136 disposed in a span-wise manner adjacent to the trailing edge 116. A plurality of turbulators 160 are disposed in the trailing edge plenum 128 for enhancing the cooling fluid flow C as it passes through the plenum 128. It should be understood that the core view of FIG. 5 illustrates a solid view of what would be the hollow interior of the airfoil 92 through which cooling air flows. The trailing edge ejection holes 136 provide the cooling flow from the pin bank 158 or the tip flag 156 to the trailing edge 116.

Figure 6:
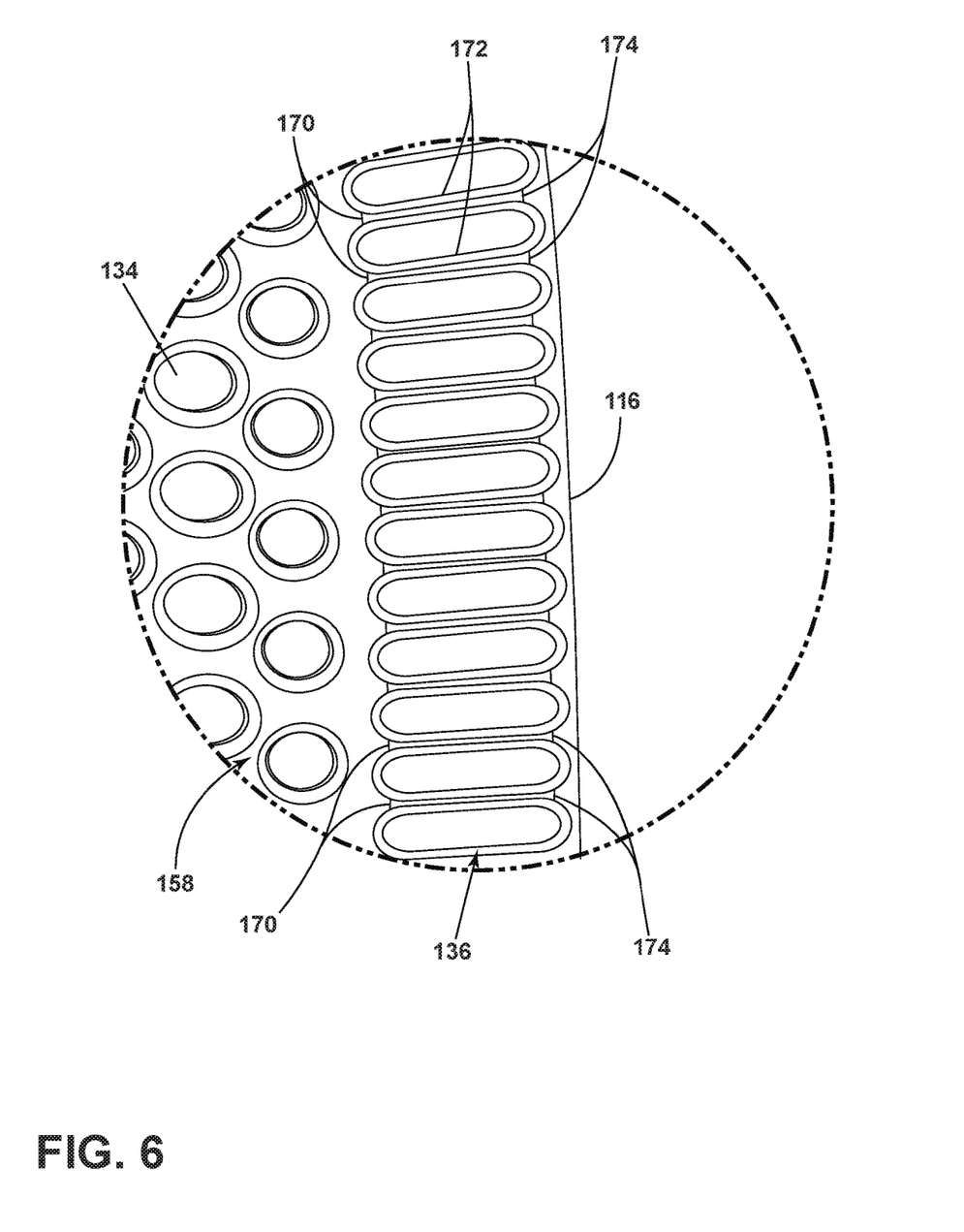
FIG. 6 is a close-up view of trailing edge ejection holes of the core of FIG. 5.

FIG. 6 illustrates a close-up view of the trailing edge 116, illustrating a portion of the ejection holes 136 and the pin bank 158. The ejection holes 136 are shaped having an inlet 170, a conduit 172, and an outlet 174. The flow of cooling air exiting the pin bank 158 is provided to the ejection holes 136 at the inlet 170. The flow of cooling air passes through the conduit 172 and is exhausted from the ejection holes 136 at the outlet 174. The exhausted cooling flow is provided to the trailing edge 116 where it can be exhausted from the airfoil 92.

Figure 7:
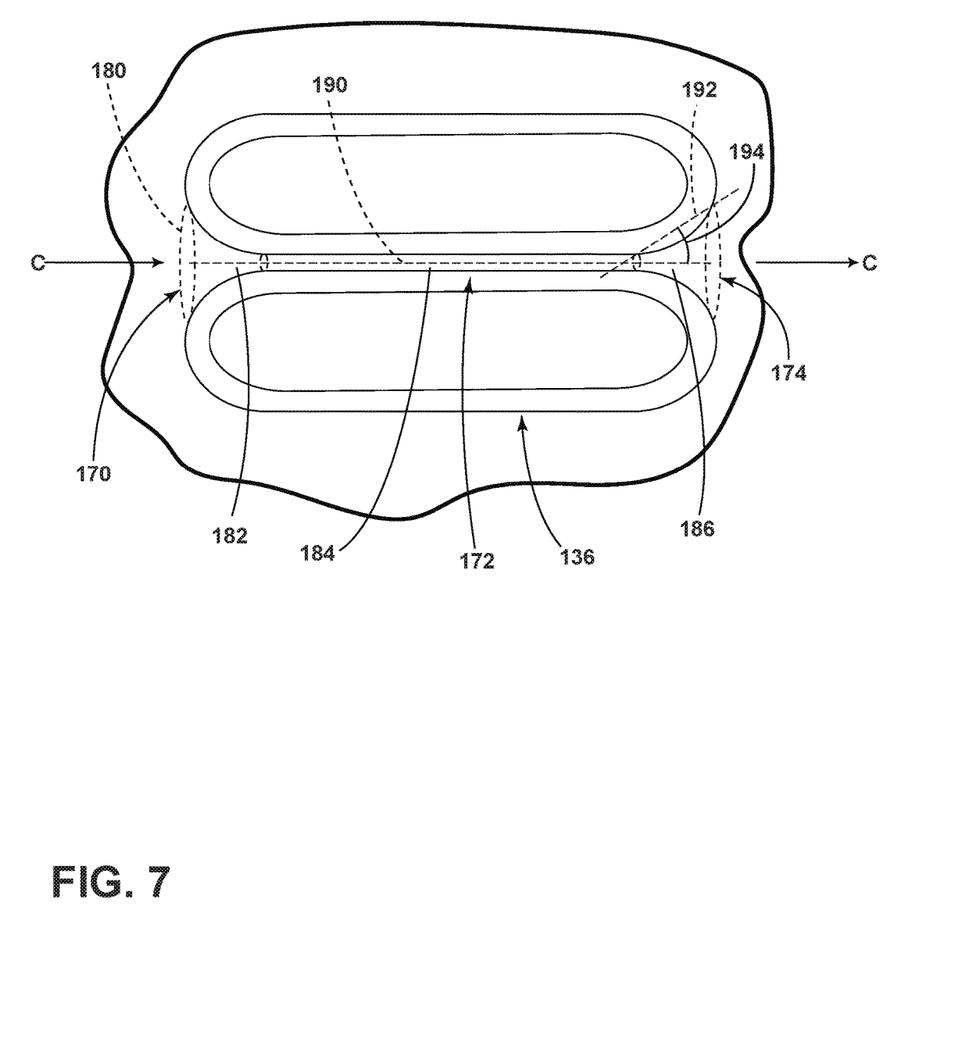
FIG. 7 is a schematic view illustrating the geometry of one trailing edge ejection hole of FIG. 6.

Looking at FIG. 7, the inlet 170 can have a circumferentially radiused inlet 180 at the internal intersection between the ejection hole 136 and the internal air supply. The circumferentially radiused inlet 180 provides a flow of cooling fluid C to a converging section 182. The flow of cooling fluid C entering inlet radius 180 passes into the converging section 182, where the flow of cooling fluid C is accelerated by a decreasing cross-sectional area of the converging section 182, being provided to the conduit 172. The conduit 172 can define a metering section 184 to meter the flow of cooling fluid C passing through the ejection hole 136. From the metering section 184, the flow of cooling fluid C passes to a diverging section 186 for decelerating the cooling flow C through an increasing cross-sectional area, being provided to the trailing edge 116.

A hole centerline 190 can be defined as the meanline axis extending through the ejection holes 136. The centerline 190 can be linear or non-linear, and can be disposed parallel to the pressure sidewall 110 or the suction sidewall 112, or can define an angle bisecting the airfoil 92 into two equal or unequal halves. A diverging axis 192 can be defined as the linear line connecting the end of the metering section 184 to the outlet 174. An expansion angle 194 can be the angle between the hole centerline 190 and the diverging axis 192, such that the cooling flow does not detach from the wall. The expansion angle 194, for example, can be an angle of seven degrees or less in non-limiting examples, while a larger angle is contemplated.

Additionally, the metering section 184 can have a length and a diameter such that a ratio of length to diameter is at least 1.0, and can be 2.0. In one example, the metering section 184 can be 40 mils. Furthermore, it is contemplated that one or more turbulators can be disposed in the trailing edge ejection holes 136. For example, the turbulators could be disposed in the metering section 184.

It should be further appreciated that the trailing edge ejection holes 136 as illustrated are exemplary. The trailing edge ejection holes 136 can vary in shape or size, or both. They ejection holes 136 themselves, or the individual parts such as the converging section 182, the metering section 184, or the diverging section 192 can vary in length, width, cross-sectional diameter in order to increase the cooling efficiency of the particular airfoil 92. Additionally, the trailing edge ejection holes 136 can be evenly spaced along the span of the trailing edge 116, or can be unevenly spaced, or discretely positioned as a single trailing edge ejection hole 136 or discrete groups of trailing edge ejection holes 136 as may be beneficial to the particular airfoil 92. Furthermore, the discrete holes 136 or groups thereof can vary in size, shape, or orientation in order to provide increased cooling efficiency for the airfoil 92.

Furthermore, the trailing edge ejection holes 136, when arranged along the span-wise extent of the trailing edge 116, can have a width that is greater for the ejection holes 136 near the mid-span and can have a lesser width for the ejection holes 136 near the root 96 and the tip 94.

Figure 8:
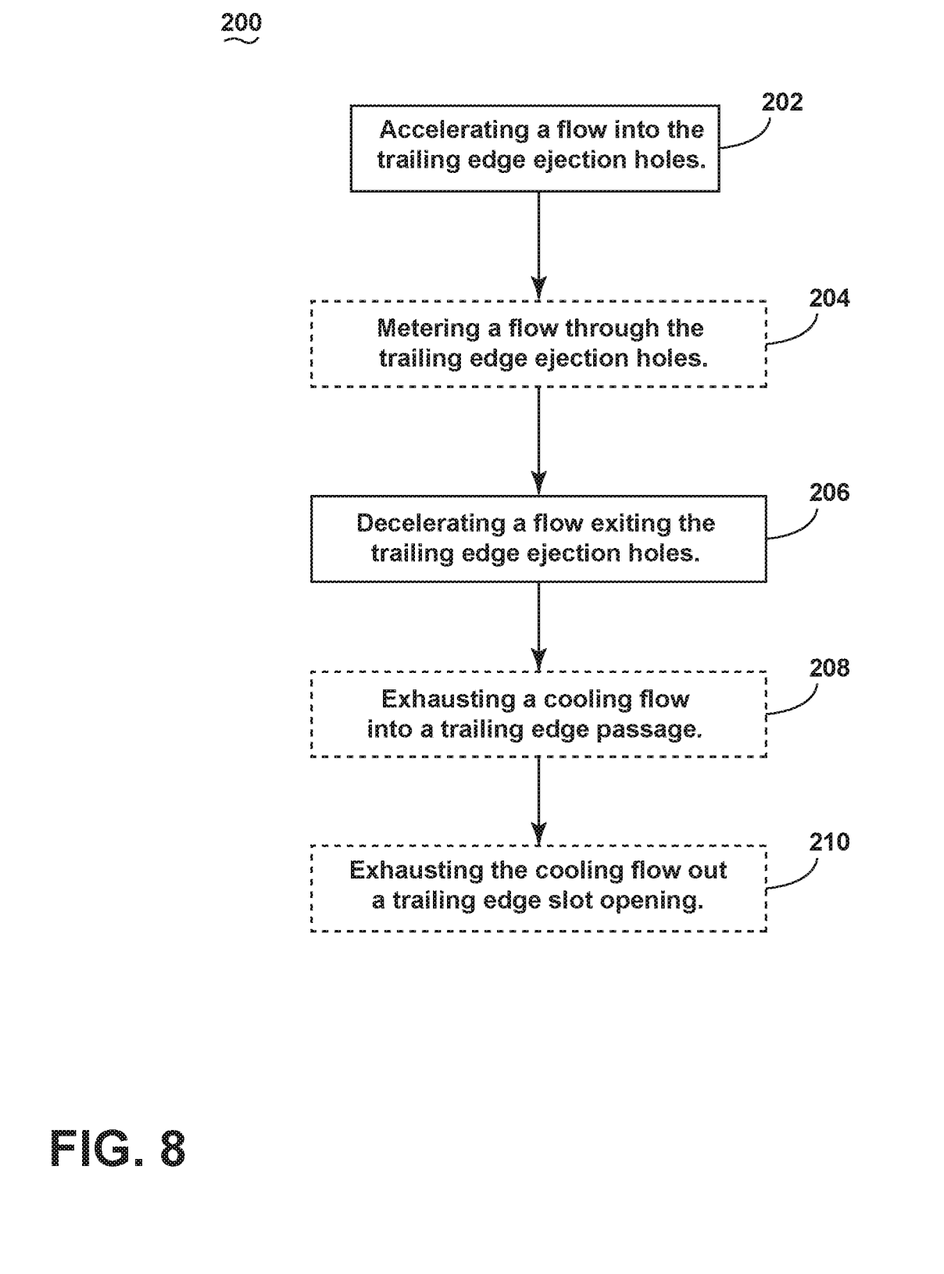
FIG. 8 is a flow chart of a method of providing a flow of cooling fluid through the trailing edge circuit.

Looking at FIG. 8, a method 200 of providing a flow of cooling fluid C through the trailing edge ejection holes 136 can include, at 202, accelerating a flow into the trailing edge ejection holes 136. The cooling fluid flow C is provided through the 360 degree inlet radius 180 into the converging section 182 to accelerate the flow. Optionally, at 204, the method 200 can include metering the flow of cooling fluid C through the trailing edge ejection holes 136 through the metering section 184. At 206, the method 200 further includes decelerating the cooling fluid flow C exiting the trailing edge ejection holes 136. Passing the cooling fluid C through the diverging section 186 decelerates the flow exiting the trailing edge ejection holes 136. Optionally, at 208, the method 200 can include exhausting the cooling fluid flow C into the trailing edge passage 138. At 210, the method 200 can optionally, further include exhausting the cooling fluid flow C out the trailing edge slot openings 140.

It should be appreciated that utilizing a trailing edge ejection holes 136 can be developed by utilizing a casting core, as opposed to other method such as drilling using electro-chemical processes. The internal structures provide for increased airfoil core strength during casting, improving the airfoil survival rate during casting operations, having an increase casting yield. Additionally, the core casting including the trailing edge ejection holes with the 360 degree inlet radius 180, the converging section 182, metering section 184, and diverging section 186 provides for improved airfoil cooling. Furthermore, the airfoil wake can be reduced to improve efficiency of the airfoil 92.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine comprising:
    an outer wall defining an interior including a pressure sidewall and a suction sidewall extending axially between a leading edge and a trailing edge defining a chord-wise direction and extending radially between a root and a tip defining a span-wise direction; and
    a trailing edge cooling circuit formed within the interior comprising:
        a trailing edge plenum extending in the span-wise direction and including a set of elongated turbulators, the trailing edge plenum transitioning to a flag passage at a tip turn, with the flag passage extending in the chord-wise direction;
        an exhaust passage downstream of the trailing edge plenum and including a plurality of pin holes forming a pin bank arranged in the exhaust passage;
        a set of impingement holes in span-wise arrangement extending between, and fluidly coupling, the trailing edge plenum and the exhaust passage, wherein fluid from the trailing edge plenum is directed toward the pin bank via the set of impingement holes;
        a set of trailing edge ejection holes in fluid communication with the exhaust passage and adjacent the trailing edge in span-wise arrangement, with each trailing edge ejection hole of the set of trailing edge ejection holes including a radiused inlet section, a converging section, a metering section having a constant cross-section extending in the chord-wise direction, and a diverging section;
        a dividing wall physically separating the flag passage from the exhaust passage, and at least partially forming one trailing edge ejection hole of the set of trailing edge ejection holes; and
        a tip cooling passage arranged at the tip, radially outward of the trailing edge plenum, tip turn, and flag passage, with the tip cooling passage fluidly coupled to the trailing edge plenum.

2. The airfoil of claim 1 wherein the converging section includes a decreasing cross-sectional area to accelerate a flow of air into each trailing edge ejection hole of the set of trailing edge ejection holes.

3. The airfoil of claim 2 wherein the diverging section includes an increasing cross-sectional area to decelerate the flow of air exiting each trailing edge ejection hole of the set of trailing edge ejection holes.

4. The airfoil of claim 3 wherein the diverging section defines an expansion angle being 7 degrees or less.

5. The airfoil of claim 1 wherein a centerline of each trailing edge ejection hole of the set of trailing edge ejection holes is parallel to one of the pressure sidewall or the suction sidewall.

6. The airfoil of claim 1 wherein a centerline of each trailing edge ejection hole of the set of trailing edge ejection holes equally bisects the airfoil.

7. The airfoil of claim 1 wherein the metering section has a length and a diameter defining a length to diameter ratio of at least 1.

8. The airfoil of claim 7 wherein the length to diameter ratio is 2.

9. The airfoil of claim 1 wherein the airfoil is one of a blade or a vane.

10. The airfoil of claim 1 further comprising a plurality of turbulators disposed in the set of trailing edge ejection holes.

11. The airfoil of claim 1 wherein the tip cooling passage being fluidly coupled to the trailing edge plenum is provided by a tip duct.

12. The airfoil of claim 1 wherein at least some of the set of trailing edge ejection holes are provided in the flag passage exhausting to the trailing edge.

13. The airfoil of claim 1 wherein the dividing wall terminates prior to the trailing edge.

14. An airfoil for a turbine engine comprising:
an outer wall defining an interior including a pressure sidewall and a suction sidewall extending axially between a leading edge and a trailing edge defining a chord-wise direction and extending radially between a root and a tip defining a span-wise direction; and
a trailing edge cooling circuit formed within the interior comprising:
a trailing edge plenum extending in the span-wise direction and transitioning to a flag passage at a tip turn, with the flag passage extending in the chord-wise direction;
an exhaust passage downstream of, and fluidly coupled to, the trailing edge plenum;
a set of impingement holes in span-wise arrangement extending between, and fluidly coupling, the trailing edge plenum and the exhaust passage;
a tip cooling passage located radially outward of the trailing edge plenum, the tip turn, and the flag passage, and fluidly coupled to the flag passage;
a set of trailing edge ejection holes in fluid communication with the exhaust passage and adjacent the trailing edge in span-wise arrangement;
a first dividing wall at least partially defining the flag passage and the exhaust passage, and physically separating the exhaust passage from the flag passage and at least partially forming one trailing edge ejection hole of the set of trailing edge ejection holes; and
a second dividing wall at least partially defining the tip cooling passage and the flag passage, and physically separating the tip cooling passage from the flag passage.

15. The airfoil of claim 14 wherein at least one of the first or second dividing walls terminates upstream of the trailing edge.

16. The airfoil of claim 14 further comprising a tip duct extending through the second dividing wall to provide the fluid coupling between the flag passage and the tip cooling passage.

17. The airfoil of claim 16 wherein the set of trailing edge ejection holes exhaust to the trailing edge.

18. The airfoil of claim 17 wherein at least some of the trailing edge ejection holes in the set are provided in the flag passage.

19. The airfoil of claim 17 wherein each of the trailing edge ejection holes in the set comprises a radiused inlet section, a converging section, a metering section, and a diverging section in axial flow arrangement.

20. The airfoil of claim 19 wherein the metering section includes a constant cross-section extending in the chord-wise direction.

21. The airfoil of claim 20 wherein the converging section includes a decreasing cross-sectional area to accelerate a flow of air into each trailing edge ejection hole of the set of trailing edge ejection holes.

22. The airfoil of claim 21 wherein the diverging section includes an increasing cross-sectional area to decelerate the flow of air exiting each trailing edge ejection hole of the set of trailing edge ejection holes.

23. The airfoil of claim 22 wherein the diverging section defines an expansion angle being 7 degrees or less.

24. The airfoil of claim 19 wherein a centerline of each trailing edge ejection hole of the set of trailing edge ejection holes is parallel to one of the pressure sidewall or the suction sidewall.

25. The airfoil of claim 19 wherein a centerline of each trailing edge ejection hole of the set of trailing edge ejection holes equally bisects the airfoil.

26. The airfoil of claim 19 wherein the metering section has a length and a diameter defining a length to diameter ratio of at least 1.

27. The airfoil of claim 26 wherein the length to diameter ratio is 2.

28. The airfoil of claim 17 further comprising a plurality of turbulators disposed in the set of trailing edge ejection holes.

29. The airfoil of claim 14 further comprising a plurality of pin holes forming a pin bank arranged in the exhaust passage upstream of the trailing edge.

* * * * *